United States Patent
Dessloch et al.

(10) Patent No.: US 6,633,889 B2
(45) Date of Patent: Oct. 14, 2003

(54) MAPPING PERSISTENT DATA IN MULTIPLE DATA SOURCES INTO A SINGLE OBJECT-ORIENTED COMPONENT

(75) Inventors: Stefan Dessloch, San Jose, CA (US); Cynthia Maro Saracco, San Jose, CA (US); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 09/764,611

(22) Filed: Jan. 17, 2001

(65) Prior Publication Data

US 2002/0095423 A1 Jul. 18, 2002

(51) Int. Cl.$^7$ .............................................. G06F 17/00
(52) U.S. Cl. .............................. 707/103 Y; 707/103 R; 707/103 Z
(58) Field of Search ........................ 707/1–2, 10–103 Z, 707/104.1, 513; 345/749; 717/100, 102, 108; 715/513

(56) References Cited

U.S. PATENT DOCUMENTS

| | | |
|---|---|---|
| 5,426,747 A | 6/1995 | Weinreb et al. |
| 5,627,979 A | 5/1997 | Chang et al. |
| 5,729,739 A | 3/1998 | Cantin et al. |
| 5,765,161 A | 6/1998 | Blackman et al. |
| 5,794,247 A | 8/1998 | Blackman et al. |
| 6,061,515 A | 5/2000 | Chang et al. |
| 2002/0091702 A1 * | 7/2002 | Mullins ...................... 707/100 |
| 2002/0133504 A1 * | 9/2002 | Vlahos et al. ............ 707/104.1 |

FOREIGN PATENT DOCUMENTS

| | | | |
|---|---|---|---|
| EP | 0690375 A2 | 1/1996 | ............. G06F/9/44 |
| JP | 3138734 A | 5/1991 | ........... G06F/15/40 |

* cited by examiner

Primary Examiner—Alford Kindred
(74) Attorney, Agent, or Firm—Sandra M. Parker, Esq.

(57) ABSTRACT

A method, apparatus and article of manufacture is provided for mapping persistent data objects residing in multiple data sources into a single, reusable software component accessible to an object-oriented programming language application performed by the computer, for multi-database access to data that may be physically distributed and stored in disparate DBMSs, each stored in an electronic storage device coupled to the computer. The method has steps for identifying data objects in multiple data sources, employing a multi-database software facility for connecting to the data sources containing the data objects, and registering the data objects with the multi-database software facility, creating a single virtual data object consolidating multiple attributes from the registered data objects, and establishing a connection to the multi-database software facility for referencing the virtual data object as though it was a single real data object. It also has a step for wrapping this virtual data object as a reusable software component accessible directly from object-oriented programming language applications.

27 Claims, 2 Drawing Sheets

MAPPING PERSISTENT DATA IN MULTIPLE DATA SOURCES INTO A SINGLE OBJECT-ORIENTED COMPONENT

BACKGROUND OF THE INVENTION

1. Field of the Invention

The present invention generally relates to database management systems, and, more particularly, to mechanisms within computer-based database management systems for mapping persistent data residing in multiple data sources into a single, reusable software component accessible to object-oriented application developers.

2. Description of Related Art

The increasing popularity of electronic commerce has prompted many firms to turn to application servers to deploy and manage their Web applications effectively. Quite commonly, these application servers are configured to interface with a database management system (DBMS) for storage and retrieval of data. This often means that new Web applications must work with "legacy" environments. As a result, Web application developers frequently find they have little or no control over which DBMS product is to be used to support their applications or how the database is to be designed. In some cases, developers may even find that data critical to their application is spread across multiple DBMSs developed by different software vendors.

The e-commerce community commonly uses entity Enterprise JavaBeans (EJBs) when persistence is required, that is, when data associated with Java objects must continue to exist (or persist) beyond the boundaries of an application session. Most frequently, entity EJBs use a relational DBMS for such storage purposes. EJB developers can create one of two kinds of entity EJBs: those with container-managed persistence or those with bean-managed persistence. Container-managed persistence is often favored, as it relieves the bean developer from writing the data access code; instead, the system running the container in which the EJB resides will automatically generate and execute the appropriate SQL as needed. By contrast, entity beans with bean-managed persistence require the developer to code and maintain his/her own data access routines directly. This allows for more flexibility, but requires additional programming skills (such as greater knowledge of DBMS technology), increases labor requirements for bean development and testing, and potentially inhibits portability of the bean itself. Unfortunately, firms intent on using container-managed entity EJBs (CMP entity beans) for their e-commerce applications may encounter some stumbling blocks. The firm's Web application server of choice may not support the firm's DBMS of choice. Furthermore, if design requirements call for a CMP entity bean whose attributes must span multiple "legacy" DBMSs, this almost certainly will not be supported.

Presently, there is no possibility to map persistent data that reside in multiple data sources into a single, reusable software component accessible to object-oriented application developers. As an example, we may consider the situation in which a Java application developer needs to build a Web-based application that accesses critical data present in multiple data sources, each of which may reside on different systems and may store data in different formats. Moreover, the developer might wish to perceive data in these sources as a single Java object, as doing so would greatly simplify design, development, and maintenance issues. As a result, s/he might want to model this single Java object as an entity bean, Enterprise JavaBean (EJB), that uses container-managed persistence (CMP). Since EJBs are standard Java components supported by a variety of leading information technology vendors, they offer many potential business benefits, such as increased portability and high degrees of code reuse. Those EJBs that are container-managed place a minimal programming burden on developers.

Unfortunately, current vendor support for CMP entity beans involves access to only a single data source per bean. Thus, the developer is forced to turn to more complex (and potentially cumbersome) alternatives to gain access to needed data sources. Often, the alternatives are more costly and time-consuming to implement, require a more sophisticated set of skills to implement, and may consume additional machine resources to execute.

One presently available solution to this problem, when a Java application developer needs to build a Web-based application that accesses critical data present in multiple data sources, involves manually simulating transparent access. In that case a programmer takes on the burden of writing the software to individually connect to each of the necessary data sources, read in any necessary data, correlate (or join) the results read in from multiple data sources, perform any necessary data translations, etc. This is a substantial amount of work and is well beyond of the skill level of many programmers. Furthermore, it incurs a great deal of cost.

Moreover, a developer would have to forego the use of CMP entity beans and instead employ entity beans with bean-managed persistence (BMP). These are more time-consuming to write, as well as more difficult to debug than CMP entity beans. In addition, they require considerable knowledge of the application programming interfaces (APIs) of each data source involved and afford less opportunity for query optimization, which may inhibit performance.

Another presently available solution to the problem calls for a physical consolidation of the data, where the data from different data sources have to be copied into a single data source, which a programmer will then access. However, this raises issues involving data latency and added cost. Due to the data latency, copies of data will be slightly to significantly "older" than data contained in the original data sources. Working with out-of-date (and potentially inaccurate) data can be unacceptable to many applications. Increased costs include software costs, since additional software must be purchased, installed, configured, and maintained to copy data from one source to another on a scheduled or periodic basis, as well as the labor costs involved with it. The software must support data migration effort or implementing a data replication process that supports very low data latency.

Therefore, there is a need to provide a method and a system which can map persistent data residing in multiple data sources into a single, reusable software component, accessible to object-oriented application developers. This would simplify the design, development, and maintenance of applications and, in some cases, provide applications with a function that would otherwise be inaccessible.

SUMMARY OF THE INVENTION

The foregoing and other objects, features, and advantages of the present invention will be apparent from the following detailed description of the preferred embodiments which makes reference to several drawing figures.

One preferred embodiment of the present invention is a method for mapping persistent data objects residing in multiple data sources into a single, reusable software component accessible to an object-oriented programming language application performed by a computer, for multi-database access to DBMSs, each stored in an electronic storage device coupled to the computer. The method has the following steps:

(a) for object-oriented oriented programming language application, identifying data objects in multiple data sources;

(b) employing a multi-database software facility for connecting to the data sources containing the data objects, and registering the data objects with the multi-database software facility;

(c) using the software multi-database facility for creating a single virtual data object consolidating multiple attributes from the registered data objects;

(d) for object-oriented programming language application, establishing a connection to the multi-database software facility for referencing the virtual data object; and (e) wrapping access to the virtual data object into a reusable software component accessible directly from an object-oriented programming language application.

Another preferred embodiment of the present invention is an apparatus implementing the above-mentioned method embodiment of the present invention.

Yet another preferred embodiment of the present invention is a program storage device readable by a computer tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention is directed to a method and system for mapping persistent data that reside in multiple data sources into a single, reusable software component accessible to object-oriented application developers. Then, object-oriented application developers, such as Java developers, and third-party software packages can reference this single reusable software component in lieu of directly referencing multiple different data sources, possibly stored in different formats. Moreover, existing conventional technology in a multi-database server can automatically handle access to these back-end data sources in a transparent fashion.

Thus, developers can create CMP entity beans whose attributes span multiple data sources. Furthermore, they can access any or all of these attributes within a single transaction. Since EJBs are standard Java components supported by a variety of leading information technology vendors, they offer many potential business benefits, such as increased portability and high degrees of code reuse. Those EJBs that are container-managed place a minimal programming burden on developers.

Figure 1:
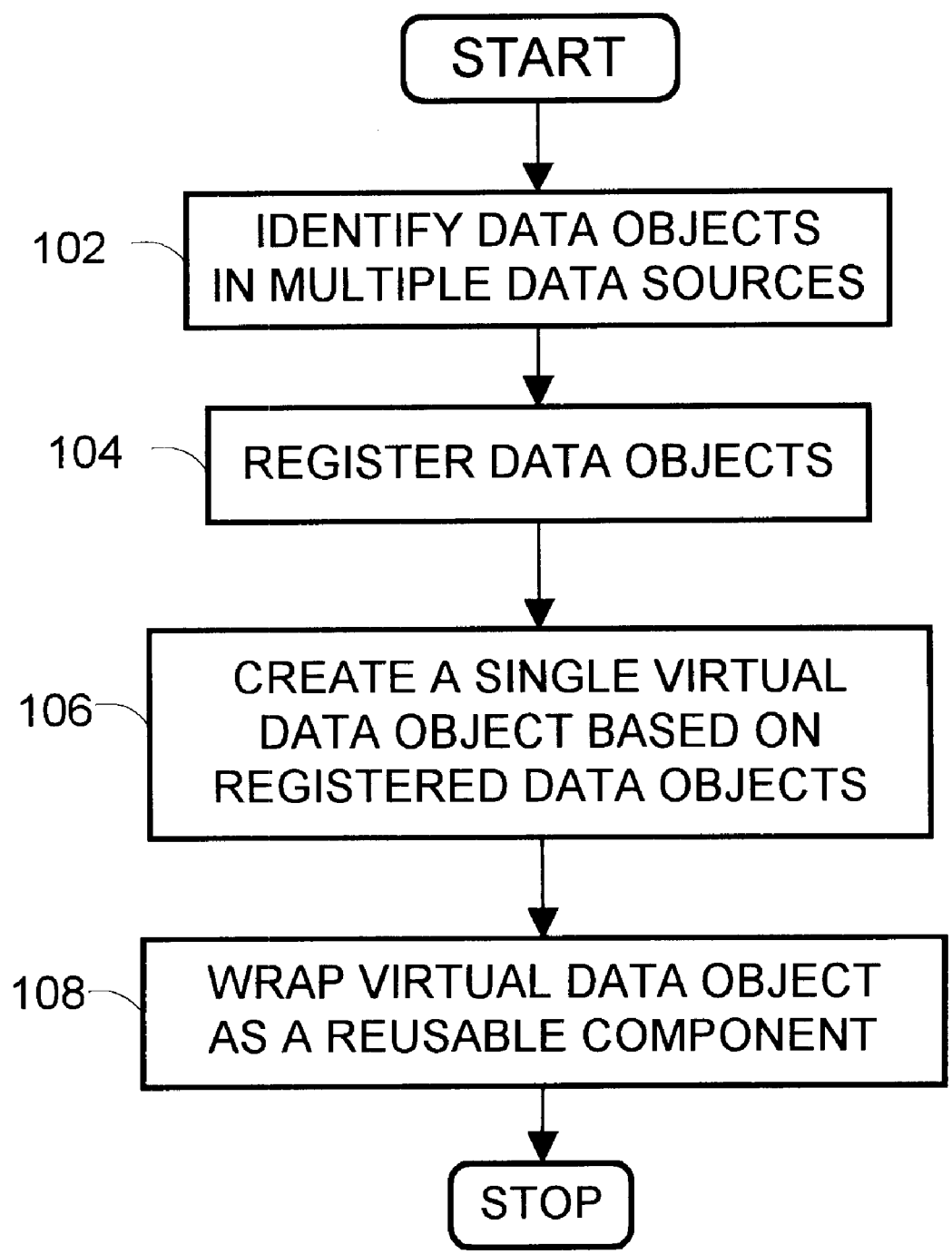
FIG. 1 illustrates a flowchart of the preferred method embodiment of the present invention.
Figure 2:
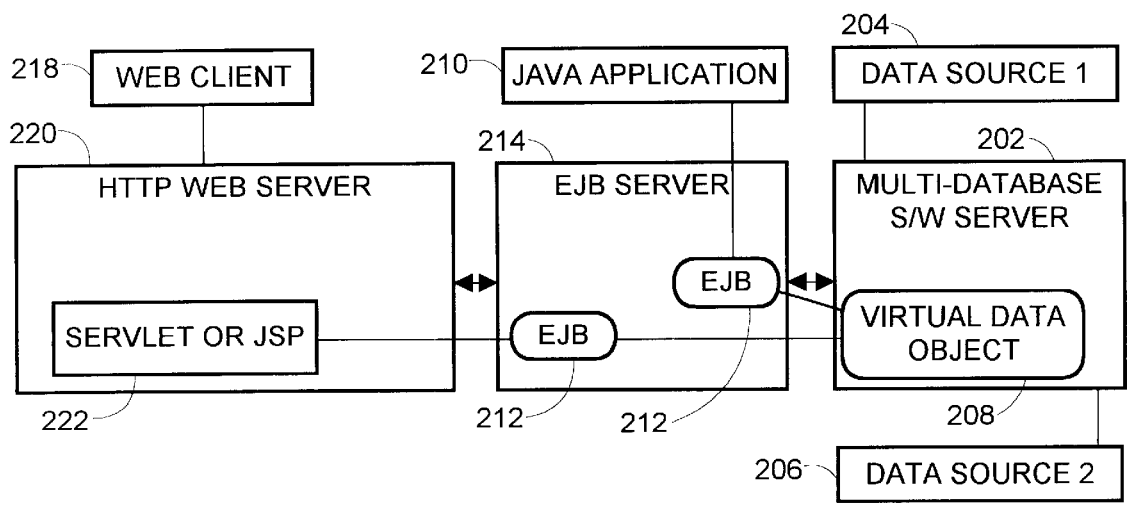
FIG. 2 illustrates a block diagram of a system implementing the preferred method embodiment of the present invention.

FIG. 1 illustrates a flowchart of the preferred method embodiment of the present invention and FIG. 2 illustrates a block diagram of a system implementing the preferred method embodiment of the present invention.

The method embodiment of the present invention includes the following steps, shown in FIG. 1. Firstly, in step 102, a user identifies data objects in different data sources of interest, which may be stored in different formats. For example, s/he may identify that certain tables residing in a DB2 database, an Oracle database, and an Informix database are relevant to his/her application. The exact nature of steps involved in data sources identification can vary. The preferred embodiment of the present invention was implemented involved issuing commands interactively, but numerous other possibilities can be employed.

In the next step 104, a user employs a software facility to connect to the data sources containing these data objects, and registers these data objects with the software facility. The software facility has to have capabilities of a multi-database software server 202, shown in FIG. 2, sometimes called a federated DBMS, which has access to multiple data sources (204, 206 of FIG. 2), each of which may reside on different systems and may store data in different formats. The preferred embodiment of the present invention was implemented using IBM's DB2 DataJoiner multi-database server.

Afterwards in step 106 of FIG. 1, using this software facility, i.e., the multi-database software server, a user creates a virtual object (shown as element 208 in FIG. 2) that consolidates multiple attributes from previously registered data objects from data sources 204, 206. One implementation of this step may involve creating such virtual object 208 as a relational DBMS view, where such view joins data from different, sometimes remote, data sources (such as tables) based on the specific needs of the application. Each such created virtual object 208 filters data as appropriate, electing sometimes to limit the virtual object (view) to a subset of the rows and columns associated with one or more data sources (tables).

In the final step 108 of FIG. 1, a user employs standard database connectivity mechanisms to connect to the software facility, i.e., the multi-database software server 202, and references the virtual data object 208 as though its contents were derived from a single real data object. Furthermore, the user wraps access to this virtual data object into a reusable software component accessible directly from an object-oriented programming language, such as a Java application 210 of FIG. 2.

One implementation of this step of the preferred embodiment of the present invention is shown in FIG. 2. It may use standard SQL to establish a connection to the multi-database server 202 and to read data represented by the view previously defined. For this step, a Java object, which may be a CMP entity bean, shown as Enterprise JavaBeans EJB 212 of FIG. 2, can be used to wrap the virtual data object 208 into a reusable software component, of use to a variety of Java application 210 developers and Java-based software tools. The user may manually create this CMP entity bean EJB 212 in an EJB server 214 and adjust its deployment descriptors as desired, or s/he may employ a variety of tools (e.g., VisualAge for Java) to automate this process.

Once the steps outlined above are completed, programmers can have access to a reusable object that hides the distributed nature of the data they need to access, and enables the developers to build CMP entity beans that span multiple data sources. Present technology and the current state of the art allows data access for read-only purposes. Sometimes, depending on the data contents and the multi-database server technology in use, it may be possible to create CMP entity beans that support read/write access, as well. However, even a read-only restriction for such support is still a considerable improvement and facilitates efficient development of many useful business applications, thus minimizing development and maintenance costs.

The preferred embodiments of the present invention were implemented in a prototype employing the following products or technologies: Java 1.1.7b, VisualAge for Java EE 3.0, WebSphere Application Server AE 3.0, IBM HTTP Server 1.3.6, DB2 DataJoiner V2.1, DB2 V6.1, Oracle DBMS, Sybase DBMS and Informix DBMS.

With the preferred embodiments of the present invention capable of mapping persistent data that reside in multiple data sources into a single, reusable software component accessible to object-oriented application developers, the reach of Enterprise JavaBeans (EJB) 212 developers was extended to Web clients 218 through the integration of a Web application server 220 and multi-database server 202 technologies. However, the benefits associated with integrating multi-database server 202 and Web application server 220 technologies are not confined to EJBs 212. In particular, those who prefer to include data access routines in their Java servlets or Java Server Pages (JSPs) 222 may also benefit from transparent multi-database access. Programmers who employ these technologies write Java Database Connectivity (JDBC) calls to handle database interactions. The multi-database server 202 can simplify the development task when programmers need to access data stored in multiple DBMSs. This is accomplished by providing a common SQL API, location transparency, and (in some cases) functional compensation. In addition, multi-database joins and unions can be performed without manually connecting to each data source, retrieving necessary data individually from each source, temporarily storing this data in some application-managed data structure, and coding the necessary logic to handle the data integration associated with a join or union operation. Such work is handled automatically by the multi-database server 202, which presents a single-site image of data that may be physically distributed and stored in disparate DBMSs.

The preferred embodiments of the present invention eliminate the need for a physical consolidation of data from different sources, thus avoiding the software and labor costs involved, as well as the logical exposures introduced due to data latency problems. It also relieves programmers of the burden of writing the software needed to individually connect to each of the necessary data sources, read in any necessary data, correlate (or join) the results read in from multiple data sources, perform any necessary data translations, etc. This is a substantial amount of work and is well beyond the skill level of many programmers and incurs a great deal of cost. Moreover, the programmers do not have to possess detailed knowledge about the differences between the different data sources.

Furthermore, presently, a developer would have to forego the use of CMP entity beans and instead employ entity beans with bean-managed persistence (BMP). These are more time-consuming to write, as well as more difficult to debug, than CMP entity beans. In addition, they require considerable knowledge of the application programming interfaces (APIs) of each data source involved and afford less opportunity for query optimization, which may inhibit performance.

The present invention provides a means to map persistent data that reside in multiple data sources into a single, reusable software component accessible to object-oriented application developers. Therefore, it simplifies the design, development, and maintenance of applications and, in some cases, provides applications with function that would otherwise be inaccessible.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for mapping persistent data objects residing in multiple data sources into a single, reusable software component accessible to an object-oriented programming language application performed by a computer, for multi-database access to DBMSs, each stored in an electronic storage device coupled to the computer, the method comprising the following steps:

(a) for object-oriented programming language application, identifying data objects in multiple data sources;

(b) employing a multi-database software facility for connecting to the data sources containing the data objects, and registering the data objects with the multi-database software facility;

(c) using the software multi-database facility for creating a single virtual data object consolidating multiple attributes from the registered data objects;

(d) for object-oriented programming language application, establishing a connection to the multi-database software facility for referencing the virtual data object; and (e) wrapping access to the virtual data object into a reusable software component accessible directly from an object-oriented programming language application.

2. The method according to claim 1, wherein the multi-database software facility including a federated DBMS, having access to multiple data sources, physically distributed and disparate DBMSs, residing on different hardware systems and possibly storing data in a different format.

3. The method according to claim 1, wherein the multi-database software facility including a multi-database server.

4. The method according to claim 1, wherein the object oriented programming language application accessing the reusable software component within a single unit of work.

5. The method according to claim 1, wherein the virtual data object being mapped into an entity bean having attributes spanning multiple data sources.

6. The method according to claim 5, wherein the entity bean being a container-managed persistence entity bean.

7. The method according to claim 1, wherein the object-oriented programming language application including an Enterprise JavaBeans (EJB) application.

8. The method according to claim 1, wherein the virtual data object being accessed from Java servlets.

9. The method according to claim 1, wherein the virtual data object being accessed from Java Server Pages (JSPs).

10. An apparatus for mapping persistent data objects residing in multiple data sources into a single, reusable software component accessible to an object-oriented programming language application, comprising:

a computer coupled to multiple electronic storage devices, said computer having multi-database access to DBMSs for storing databases;

object-oriented programming means, performed by the computer, for identifying data objects in multiple data sources;

multi-database software means, performed by the computer, for connecting to the data sources containing the data objects, and registering the data objects with the multi-database software facility;

means, performed by the computer, for using the software multi-database facility for creating a single virtual data object consolidating multiple attributes from the registered data objects;

means, performed by the computer, for object-oriented programming means, for establishing a connection to the multi-database software facility for referencing the virtual data object; and means, performed by the computer, for wrapping access to the virtual data object into a reusable software component accessible directly from an object-oriented programming language application.

11. The apparatus according to claim 10, wherein the multi-database software facility including a federated DBMS, having access to multiple data sources, physically distributed and disparate DBMSs, residing on different hardware systems and possibly storing data in a different format.

12. The apparatus according to claim 10, wherein the multi-database software facility including a multi-database server.

13. The apparatus according to claim 10, wherein the object oriented programming language application accessing the reusable software component within a single unit of work.

14. The apparatus according to claim 10, wherein the virtual data object being mapped into an entity bean having attributes spanning multiple data sources.

15. The apparatus according to claim 14, wherein the entity bean being a container-managed persistence entity bean.

16. The apparatus according to claim 10, wherein the object-oriented programming language application including an Enterprise JavaBeans (EJB) application.

17. The apparatus according to claim 10, wherein the virtual data object being accessed from Java servlets.

18. The apparatus according to claim 10, wherein the virtual data object being accessed from Java Server Pages (JSPs).

19. A program storage device readable by a computer tangibly embodying a program of instructions executable by the computer to perform method steps for mapping persistent data objects residing in multiple data sources into a single, reusable software component accessible to an object-oriented programming language application performed by the computer, for multi-database access to DBMSs, each stored in an electronic storage device coupled to the computer, the method comprising the following steps:

(a) for object-oriented programming language application, identifying data objects in multiple data sources;

(b) employing a multi-database software facility for connecting to the data sources containing the data objects, and registering the data objects with the multi-database software facility;

(c) using the software multi-database facility for creating a single virtual data object consolidating multiple attributes from the registered data objects;

(d) for object-oriented programming language application, establishing a connection to the multi-database software facility for referencing the virtual data object; and (e) wrapping access to the virtual data object into a reusable software component accessible directly from an object-oriented programming language application.

20. The method according to claim 19, wherein the multi-database software facility including a federated DBMS, having access to multiple data sources, physically distributed and disparate DBMSs, residing on different hardware systems and possibly storing data in a different format.

21. The method according to claim 19, wherein the multi-database software facility including a multi-database server.

22. The method according to claim 19, wherein the object oriented programming language application accessing the reusable software component within a single unit of work.

23. The method according to claim 19, wherein the virtual data object being mapped into an entity bean having attributes spanning multiple data sources.

24. The method according to claim 23, wherein the entity bean being a container-managed persistence entity bean.

25. The method according to claim 19, wherein the object-oriented programming language application including an Enterprise JavaBeans (EJB) application.

26. The method according to claim 19, wherein the virtual data object being accessed from Java servlets.

27. The method according to claim 19, wherein the virtual data object being accessed from Java Server Pages (JSPs).

* * * * *